United States Patent [19]
Bollert et al.

[11]B 4,035,343
[45] July 12, 1977

[54] FLAME RESISTANT SYNTHETIC LINEAR POLYESTERS AND SHAPED STRUCTURES MADE THEREOF

[75] Inventors: Ulrich Bollert, Hofheim/Taunus; Hans-Jerg Kleiner, Bad Soden/Taunus; Franz Jakob, Hofheim/Taunus, all of Germany

[73] Assignee: Farbwerke Hoechst Aktiengesellschaft vormals Meister Lucius & Bruning, Frankfurt/Main, Germany

[21] Appl. No.: 390,738

[22] Filed: Aug. 23, 1973

[44] Published under the first Trial Voluntary Protest Program on Jan. 28, 1975 as document No. B 390,738

[30] Foreign Application Priority Data

Aug. 26, 1972 Germany .......................... 2242002

[51] Int. Cl. .............................................. C08g 63/12
[52] U.S. Cl. ...................... 260/75 P; 260/DIG. 24
[58] Field of Search ................................. 260/75 P

[56] References Cited

U.S. PATENT DOCUMENTS 3,629,365  12/1971  Gardner .............................. 260/857

FOREIGN PATENT DOCUMENTS 771,302  8/1971  Belgium

Primary Examiner—Melvin I. Marquis
Attorney, Agent, or Firm—Henry W. Koster

[57] ABSTRACT

Permanently flame-resistant synthetic linear polyesters are obtained by incorporating by condensation into the polyester composed of the usual dicarboxylic acid and diol units an alkylphosphine oxide of the formula

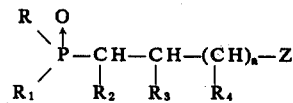

wherein the radicals R to $R_4$ represent organic radicals of which $R_2$, $R_3$ and Z may be substituted by 2 hydroxyl groups altogether, $R_2$, $R_3$ and $R_4$ may also represent hydrogen and $a$ is zero or a whole number of from 1 to 4. The flame-resistant polyesters are processed into shaped structures such as fibers, filaments, sheets, injection and compression molded articles characterized by good flameproofness and dyeing properties.

6 Claims, No Drawings

FLAME RESISTANT SYNTHETIC LINEAR POLYESTERS AND SHAPED STRUCTURES MADE THEREOF

The present invention relates to flame-resistant synthetic linear polyesters containing phosphorus and to shaped structures made thereof, such as fibers, filaments, sheets, injection and compression molded articles.

It is known that many phosphorus containing compounds have flame-retardant properties. Phosphorus compounds of this type are, therefore, used as flame-retardant finishing agents and they are incorporated into macromolecular substances on which they confer a certain degree of flameproofness.

A class of phosphorus compounds having flame-retardant properties are, for example, phosphine oxides. Halogen-containing phosphine oxides, such as tris-bromomethyl phosphine oxide, are used for flameproofing synthetic fibers (cf. German Pat. No. 1,282,599). Other phosphine oxides, for example trimethylol phosphine oxide, are incorporated by condensation into polyesters on the basis of polycarboxylic acids and polyols. When these polyesters are mixed with other polymers the latter are well protected against burning (cf. German Pat. No. 1,147,039).

The tertiary phosphine oxides disclosed in Belgium Pat. No. 771,302 can be used themselves as flameproofing agents or, owing to their reactive groups, they may confer resistance to burning on other compounds. The aforesaid Belgian specification does not contain, however, any detail in this respect.

It is the object of the present invention to provide polyesters having permanent flame-resistant properties obtained by a suitable modification agent, which polyesters can be used for the manufacture of fibers, filaments, and sheets and also injection and compression molded articles, the properties of which are not impaired noticeably as compared with the proerties of shaped articles made from the corresponding but non modified polyesters.

This problem has been solved by the development of synthetic linear polyesters into the macromolecules of which phosphine oxides as disclosed in Belgian Pat. No. 771,302 have been incorporated.

Therefore, the primary object of the present invention is a process for the manufacture of flame-resistant, synthetic, linear and phosphorus containing polyesters from dicarboxylic acids or the esters thereof with low molecular weight aliphatic alcohols, diols and phosphorus containing compounds, which comprises adding, during the manufacture of the polyester, as phosphorus containing compound a phosphine oxide of the general formula

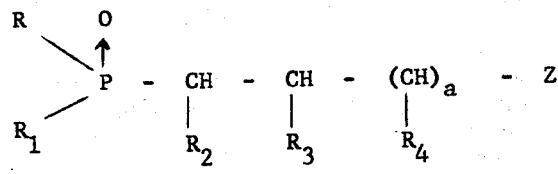

wherein R and $R_1$ represent alkyl or cycloalkyl radicals having up to 12 carbon atoms, such as $CH_3$, $C_2H_5$, $C_3H_7$, $C_4H_9$ or

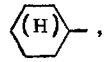

$R_2$ represents hydrogen or an alkyl radical possibly substituted by hydroxyl and having 1 to 4 carbon atoms, such as $CH_3$, $C_2H_5$, $C_3H_7$, $C_4H_9$, $CH_2OH$, $-CH_2CH_2OH$ or

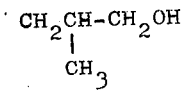

$R_3$ represents hydrogen or an alkyl radical possibly substituted by hydroxyl and having 1 to 4 carbon atoms, such as $CH_3$, $C_2H_5$, $C_3H_7$, $C_4H_9$, $CH_2OH$, $CH_2-CH_2OH$,

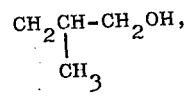

$R_4$ represents hydrogen or an alkyl radical having 1 to 4 carbon atoms, such as $CH_3$, $C_3H_5$, $C_3H_7$, $C_4H_9$,
Z represents an alkyl radical substituted by 1 or 2 hydroxyl groups and having 1 to 4 carbon atoms, such as $CH_2OH$,

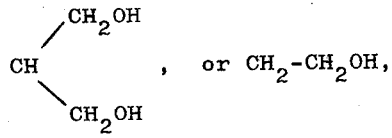

$a$ stands for zero or a whole number of from 1 to 4, and the total number of the hydroxyl groups bound to the radicals $R_2$, $R_3$, and Z being 2, in an amount of from about 4 to 15, preferably 5 to 10 mole %, of the diol component used for making the polyester.

Another object of this invention are shaped structures, such as fibers, filaments, sheets, injection and compression molded articles made from the flame-resistant, synthetic, linear and phosphorus containing polyesters obtained by the aforesaid process.

When carrying out the process of the invention starting materials as usually employed in the manufacture of fiber and film forming synthetic linear polyesters and also suitable for example, for injection molding are used and prior to, during or shortly before the end of the polycondensation the phosphine oxides having two hydroxyl groups of the above formule are added. As dicarboxylic acids there are used, either in free form or in the form of esters with low molecular aliphatic alcohols preferably having from 1 to 4 carbon atoms, especially $CH_3OH$, besides the preferred terephthalic acid also other dicarboxylic acids, preferably as cocomponets, for example isophthalic acid, 5-sulfoisophthalic acid, 5-sulfopropoxy-isophthalic acid, naphthalene-2,6-dicarboxylic acid, diphenyl-p, p'-dicarboxylic acid, p-phenylene-diacetic acid, diphenyl oxide-p, p'-dicarboxylic acid, diphenoxy-alkane- dicarboxylic acids, for example 1,2-diphenoxyethane, 4,4'-dicarboxylic acid, trans-hexahydroterephthalic acid, adipic acid, sebacic acid, 1,2-cyclobutanedicarboxylic acid and the like.

Suitable diol components are, besides the preferred ethylene glycol, for example 1,3-propanediol, 1,4-butanediol and the higher homologs thereof, 2,2-dimethyl-1,3-propanediol, or 1,4-cyclohexane-dimethanol, also as cocomponents.

When, besides terephthalic acid, one or more of the aforesaid dicarboxylic acids are used, their quantity preferably does not exceed essentially about 10 mole % of the total acid component. The conditions are similar with the diol components. When, besides ethylene glycol or butanediol, further diols are used as cocomponents, their quantity preferably does exceed about 10 mole % of the total diol component.

If free dicarboxylic acids and diols are used for the reaction, they are first esterified directly and then polycondensed in usual manner. With the use of dicarboxylic acid esters, especially the dimethyl esters, instead of the free dicarboxylic acids, first an ester interchange reaction is carried out in usual manner and the reaction mixture is then polycondensed, in each case in the presence of conventional catalysts.

The bifunctional phosphine oxides added prior to, during or shortly before the end of polycondensation are preferably prepared by the process described in Belgian Pat. No. 771,302. From among the tertiary phosphine oxides disclosed in the said patent the bifunctional compounds used in the present invention constitute a special selection.

In the final polyester the organic phosphorus compound is statistically incorporated in the macromolecule. Owing to the statistic distribution, the phosphine oxide units may sometimes also be bound at the end of the macromolecule. In order to ensure the desired flame-resistant the polyester should contain at least about 0.5 % by weight of phosphorus.

During the polyester manufacture besides the catalysts known in the art the usual additives may, of course, also be added, such as cross linking agents, dulling agents, stabilizers, dyestuffs and fillers. When the polyesters are to be used as injection and compression molding compositions nucleating agents may also be added. The condensed polyesters are then processed in usual manner to yield fibers, filaments and sheets, or injection or compression molded articles, or hollow structures such as tubes. For the manufacture of injection molded and like articles polyesters are generally used having a higher degree of polycondensation and thus a higher molecular weight than for the manufacture of fibers, filaments and sheets.

Preferred flame resistant, synthetic, linear and phosphorus containing polyesters from dicarboxylic acid and diol units are those in which about 4 to 15 mole %, preferably about 5 to 10 mole %, of the diol units are structural units of the formula

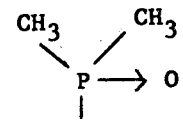

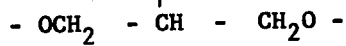

The dicarboxylic acid units are essentially terephthalic acid units and at least 85 % of the diol units are units of ethylene glycol. Small proportions of the terephthalic acid units and the ethylene glycol units may be replaced by units of the acids and diols specified above by way of example.

The preferred flame-resistant polyesters are prepared with 2-dimethyl-phosphine oxidomethyl-1,3-propanediol of the formula

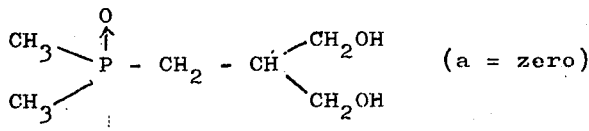

They can be processed in usual manner to yield shaped structures such as filaments, fibers, sheets, injection and compression molded articles.

The shaped articles made with the modified polyesters are characterized by very good permanent flame resistant and self-extinguishing properties. They have a good degree of whiteness and can be very well dyed with dispersion dyestuffs and dyed medium or deep shades with acid dyestuffs. Their diglycol content is not increased. The strength, the glass transition point, and the melting point of the shaped articles approximately correspond to those made from the corresponding non modified polyesters.

The polyesters of the invention and the shaped articles made therefrom are used in all fields where easy inflammability is not desired. The fibers and filaments, for example, are preferably used for making canvas, carpets, curtains, and the like. The filaments may also be used as the one component of bicomponent filaments together with other polymers as the second component.

The following examples illustrate the invention.

EXAMPLE 1

1,000 Grams of dimethyl terephthalate (DMT), 230 mg of MnAc$_2$ . 4 H$_2$O and 740 ml of ethylene glycol were subjected under nitrogen to an ester interchange reaction. After termination of the methanol separation, 40 g of 2-dimethyl-phosphine oxidomethyl-1,3-propanediol and 500 mg of Sb$_2$O$_3$ were added at 220° C. The reaction vessel was further heated, while being evacuated simultaneously, until an internal pressure of 1 mm Hg was reached at 250° C. The polycondensation was terminated at 0.2 mm Hg at 270° C. The product obtained had a relative viscosity of 1.64, measured with a 1 % solution of the polymer in dichloroacetic acid at 25° C. The melting point was found to be 253°–255° C, the phosphorus content 0.7 % and the diglycol content 0.8 %.

The polyester was polycondensed in the solid state until the relative viscosity had reached 1.98. The burning properties of the polyester were determined according to ASTM D 635/68 using test bars of the dimensions 12.7 · 1.27 cm. The product could be classified in the group of self-extinguishing substances, while the same test bars of non modified polyethylene terephthalate belonged to the class of inflammable substances.

EXAMPLE 2

Example 1 was repeated with the exception that 100 g of 2-dimethyl-phosphine oxidomethyl-1,3-propanediol were used instead of 40 grams of said compound. The polyester, which was not subjected to condensation in the solid state, had a relative viscosity of 1.65, a melting point of 240°–241° C, a phosphorus content of 1.6 % and a diglycol content of 0.9 %.

The polyester was spun from the melt under the usual conditions and the filaments obtained were drawn in a ratio of 1:3.65. They had a strength of 3.1 g/dtex at an elongation at break of 22 %. With the filaments a knitted hose was produced which was used for carrying out dyeing tests and a burning test. Deep shades were obtained with the following acid dyestuffs Supranol fast red Br (Color Index No. 24,790)
Alphanol fast blue (Color Index No. 62,155) and
Lana pearl yellow 3 (Color Index No. 19,025)

For the burning test a piece of the knitted hose was burned on a semi-circle tester according to DIN 54 331 over a carrier fabric of cotton. The flame extinguished at an angle of 100° to 110°. A comparative knitted hose made from filaments of non modified polyethylene terephthalate burned completely.

EXAMPLE 3

Example 2 was repeated with the exception that in the ester interchange reaction 5 mole % of DMT were replaced by dimethylisophthalate. The polyester had a melting point of 237°C and a relative viscosity of 1.60. Knitted hoses made from the polyester extinguished on the semi-circle tester likewise at an angle of 100° to 110°.

What is claimed is:

1. Flame-resistant, synthetic, linear and phosphorus-containing polyesters consisting essentially of dicarboxylic acid and diol units and wherein 4 to 15 mole % of the diol units are derived from a diol of the formula

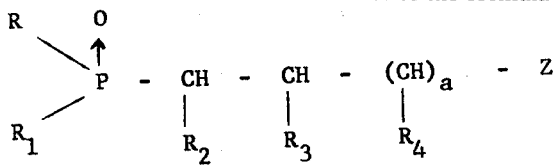

wherein R and $R_1$ are alkyl or cycloalkyl radicals of up to 12 carbon atoms, $R_2$ and $R_3$ are hydrogen or an alkyl radical of 1 to 4 carbon atoms which may be substituted by hydroxyl, $R_4$ is hydrogen or an alkyl radical of 1 to 4 carbon atoms, Z is an alkyl radical of 1 to 4 carbon atoms substituted by 1 or 2 hydroxyl groups, $a$ is zero to 4, and the total number of hydroxyl groups on the radicals $R_2$, $R_3$ and Z is 2.

2. Shaped structures such as fibers, filaments, sheets, injection and compression molded articles and hollow bodies made from flame resistant, synthetic, linear and phosphorus-containing polyesters as defined in claim 1.

3. Flame-resistant, synthetic, linear and phosphorus-containing polyester consisting essentially of dicarboxylic acid and diol units and wherein 4 to 15 mole % of the diol units are units of the formula

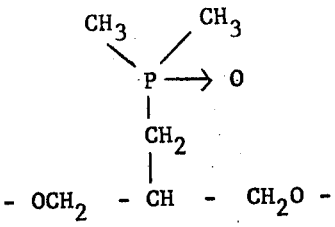

4. Flame-resistant, synthetic, linear and phosphorus containing polyesters as claimed in claim 3, containing 5 to 10 mole % of the phosphorus-containing units.

5. Flame-resistant synthetic linear and phosphorus-containing polyesters as claimed in claim 3, wherein the dicarboxylic acid units are essentially terephthalic acid units and at least 85 mole % of the diol units are units of ethylene glycol.

6. Shaped articles made from the flame-resistant polyesters as claimed in claim 3.

* * * * *